(12) United States Patent
Ativanichayaphong et al.

(10) Patent No.: US 8,311,836 B2
(45) Date of Patent: Nov. 13, 2012

(54) DYNAMIC HELP INCLUDING AVAILABLE SPEECH COMMANDS FROM CONTENT CONTAINED WITHIN SPEECH GRAMMARS

(75) Inventors: Soonthorn Ativanichayaphong, Boca Raton, FL (US); David Jaramillo, Lake Worth, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1416 days.

(21) Appl. No.: 11/375,417

(22) Filed: Mar. 13, 2006

(65) Prior Publication Data

US 2007/0213984 A1    Sep. 13, 2007

(51) Int. Cl.
*G10L 21/00* (2006.01)
*G10L 15/04* (2006.01)

(52) U.S. Cl. .............. 704/270.1; 704/275; 704/251

(58) Field of Classification Search .................. None
See application file for complete search history.

(56) References Cited

U.S. PATENT DOCUMENTS

| | | | |
|---|---|---|---|
| 5,438,659 A * | 8/1995 | Notess et al. ............... 715/202 |
| 5,727,129 A * | 3/1998 | Barrett et al. ............... 706/10 |
| 5,819,225 A * | 10/1998 | Eastwood et al. .......... 704/275 |
| 5,890,122 A | 3/1999 | Van Kleeck et al. |
| 5,933,139 A * | 8/1999 | Feigner et al. ............ 715/708 |
| 6,144,938 A * | 11/2000 | Surace et al. ............. 704/257 |
| 6,269,336 B1 | 7/2001 | Ladd |
| 6,434,524 B1 | 8/2002 | Weber |
| 6,456,972 B1 | 9/2002 | Gladstein et al. |
| 6,490,564 B1 * | 12/2002 | Dodrill et al. ............. 704/275 |
| 6,882,974 B2 * | 4/2005 | James et al. ............. 704/270.1 |
| 6,993,486 B2 * | 1/2006 | Shimakawa ............... 704/275 |
| 7,177,814 B2 * | 2/2007 | Gong et al. .............. 704/270.1 |
| 7,302,392 B1 * | 11/2007 | Thenthiruperai et al. ... 704/251 |
| 2002/0169618 A1 | 11/2002 | Caspari |
| 2003/0120494 A1 | 6/2003 | Jost et al. |
| 2003/0182622 A1 * | 9/2003 | Sibal et al. ............... 715/511 |
| 2004/0006474 A1 | 1/2004 | Gong et al. |
| 2004/0006476 A1 | 1/2004 | Chiu |
| 2004/0006480 A1 | 1/2004 | Ehlen et al. |
| 2004/0138899 A1 * | 7/2004 | Birnbaum et al. .............. 705/1 |
| 2004/0230434 A1 * | 11/2004 | Galanes et al. ........... 704/270.1 |
| 2005/0010418 A1 | 1/2005 | McNair et al. |
| 2005/0039108 A1 | 2/2005 | Hudson |
| 2005/0075884 A1 | 4/2005 | Badt, Jr. |
| 2005/0273487 A1 * | 12/2005 | Mayblum et al. .......... 709/202 |
| 2006/0287858 A1 * | 12/2006 | Cross et al. .............. 704/257 |

OTHER PUBLICATIONS

Office Action from corresponding Chinese Application No. 200710084667.4 dated Oct. 23, 2009.

Xu Zhixing et al., "Voice Browser in Compliance with VoiceXML2.0," NCMMSC7, Dec. 31, 2003.

* cited by examiner

*Primary Examiner* — Jesse Pullias (74) *Attorney, Agent, or Firm* — Wolf, Greenfield & Sacks, P.C.

(57) ABSTRACT

A method for providing help to voice-enabled applications, including multimodal applications, can include a step of identifying at least one speech grammar associated with a voice-enabled application. Help fields can be defined within the speech grammar. The help fields can include available speech commands for the voice enabled application. When the speech grammar is activated for use by the voice-enabled application, the available speech commands can be presented to a user of the voice-enabled application. The presented speech commands can be obtained from the help fields.

22 Claims, 7 Drawing Sheets

| Grammar Tree 410 | | | | |
|---|---|---|---|---|
| Beverage 412 | Request Preludes 413 | Article 415 | Size 416 | Type 417 |
| Beverage | I would like<br>I want<br><please> give me | a<br>an | 422 { small<br>size 424<br>large | coffee<br>milk<br>soft drink type 434<br>lemonade |

| Grammar Tree 420 |
|---|
| Size 424 |
| medium |
| regular |

| Grammar Tree 430 |
|---|
| Soft drink type 434 |
| soda |
| pop |
| cola |

400

440

```xml
<?xml version="1.0" encoding="iso-8859-1"?>
<!DOCTYPE grammar PUBLIC "-//W3C//DTD GRAMMAR 1.0//EN" "http://www.w3.org/TR/speech-grammar/grammar.dtd">
<grammar version="1.0" xmlns="http://www.w3.org/2001/06/grammar"
        tag-format="semantics/1.0" xml:lang="en-US" mode="voice"
        root="beverage">
    <meta name="Description" content="What would you like to drink?"/>        — 443
    <meta name="Identifier" content="context-sensitive"/>                     — 444
    <meta name="instructionalMethod" content="help/drinkhelp.mxml"/>          — 445

<rule id="beverage" scope="public">
        <example>I would like a medium coffee.</example>
        <item repeat="0-1">
            <one-of>
                <item>I would like</item>
                <item>I want</item>
                <item><item repeat="0-1">please</item>
                    give me
                </item>
            </one-of>
        </item>
        <item repeat="0-1">a</item>
        <ruleref uri="#size" />
        <tag><![CDATA[$.size=$size;]]></tag>
        <ruleref uri="#type" />
        <tag><![CDATA[$.type=$type;]]></tag>
    </rule>
    <rule id="size">
        <one-of>
            <item>small<tag><![CDATA[$="small";]]></tag></item>
            <item><item>
                <one-of>
                    <item>medium</item>
                    <item>regular</item>
                </one-of>
            </item><tag><![CDATA[$="medium";]]></tag>
            </item>
            <item>large<tag><![CDATA[$="large";]]></tag></item>
        </one-of>
    </rule>
    <rule id="type">
        <one-of>
            <item>coffee</item>
            <item>milk</item>
            <item><item>
                <one-of>
                    <item>soda</item>
                    <item>pop</item>
                    <item>coke</item>
                </one-of>
            </item><tag><![CDATA[$="soda";]]></tag>
            </item>
            <item>lemonade</item>
        </one-of>
    </rule>
</grammar>
```

Help 442: lines 443, 444, 445 (meta tags)

Example 446: `<example>I would like a medium coffee.</example>`

FIG. 4

```
<?xml version="1.0" encoding="iso-8859-1"?>
<!DOCTYPE html PUBLIC "-//VoiceXML Forum//DTD XHTML+Voice 1.2//EN" "http://www.voicexml.org/specs/
multimodal/x+v/12/dtd/xhtml+voice12.dtd">
<html xmlns="http://www.w3.org/1999/xhtml"
 xmlns:ev="http://www.w3.org/2001/xml-events"
 xmlns:xv="http://www.voicexml.org/2002/xhtml+voice"
 xmlns:vxml="http://www.w3.org/2001/vxml"
 xml:lang="en-US">
<head>
  <title>What would you like to drink?</title>

<vxml:form id="drinkform">
     <vxml:field name="drink" xv:id="drink_field">          ⎯510
       <vxml:grammar src="beverage.grxml"/>
       <vxml:prompt>What would you like to drink?</vxml:prompt>  ⎯⎯ Grammar Prompt 520
       <vxml:block>
         Your <vxml:value expr="drink"/> is coming right up!
       </vxml:block>
     </vxml:field>
  </vxml:form>

<xv:sync xv:field="#drink_field" xv:input="in1"/>

</head>
<body bgcolor="#FFFFFF" ev:event="load" ev:handler="#drinkform">
  <h2>What would you like to drink?</h2>
  <form id="fid" action="cgi/drink.pl">           ⎯⎯ Grammar Prompt 522
     <table>
       <tbody>
         <tr><td>Drink:</td>
           <td>
             <input type="text" name="in1"/>
           </td>
         </tr>
       </tbody>
     </table>
  </form>
</body>
</html>
```

FIG. 5

```
<?xml version="1.0" encoding="iso-8859-1"?>
<!DOCTYPE html PUBLIC "-//VoiceXML Forum//DTD XHTML+Voice 1.2//EN" "http://
www.voicexml.org/specs/multimodal/x+v/12/dtd/xhtml+voice12.dtd">
<html xmlns="http://www.w3.org/1999/xhtml"
 xmlns:ev="http://www.w3.org/2001/xml-events"
 xmlns:xv="http://www.voicexml.org/2002/xhtml+voice"
 xmlns:vxml="http://www.w3.org/2001/vxml"
 xml:lang="en-US">
<head>
  <title>Drink Help</title>

<vxml:form id="drinkform">
    <vxml:block>                                           ⎯Voice Prompt 620
      <vxml:prompt>What would you like to drink?</vxml:prompt>
      <vxml:prompt>For example, say "I would like a medium coffee."
      </vxml:prompt>                                        ⎯Voice Example 622
    </vxml:block>
  </vxml:form>

</head>
<body bgcolor="#FFFFFF" ev:event="load" ev:handler="#drinkform">
  <h2>Drink Help</h2>
  <p>What would you like to Drink?</p>    ⎯⎯Visual Prompt 626
  <p>For example, say "I'd like a medium coffee."</p>  ⎯⎯Visual Example 628
</body>
</html>
```

DYNAMIC HELP INCLUDING AVAILABLE SPEECH COMMANDS FROM CONTENT CONTAINED WITHIN SPEECH GRAMMARS

BACKGROUND

1. Field of the Invention

The present invention relates to the field of speech processing, and, more particularly, to placing grammar specific help including available speech commands within speech grammars.

2. Description of the Related Art

Multimodal interactions occur through a computing interface having multiple redundant interaction modes through which a user can interface. Typical modes for a multimodal interface include a graphical user interface (GUI) mode and a speech mode. Both input and output can be sent and received through either mode.

The speech mode can be particularly important when a multimodal application executes upon a computing device that has limited or inconvenient input/output peripherals attached. This is particularly true for mobile, embedded, and wearable computing devices.

For example, many smart phones include a touch screen GUI and a speech interface. The speech interface can receive spoken input that is automatically converted to text and placed in an application, such as an email application or a word processing application. This spoken input mechanism can be significantly easier for a user than attempting to input a textual message using a touch screen input mechanism included with the GUI mode of the device. Additionally, the device may be utilized in an environment where a relatively small screen (due to the mobile nature of a portable device) is difficult to read or in a situation where reading a display screen is overly distracting. In these situations, textual output can be converted into speech and audibly presented to a user.

One challenge with utilizing multimodal applications relates to permitted speech commands. Different commands can be selectively available depending on a state of a multimodal application. Other speech commands can be available independent of the application state. Different ones of the speech commands can be considered global commands for an application, other available speech commands can be page-level commands dependant upon a displayed window or page of the application, and still other speech commands can be context specific commands dependent upon an interface item currently possessing interface focus. Global commands can be relatively static, while the page-level commands and the context-specific commands can be dynamic. A multimodal application must provide help for all of these different types of commands.

Current techniques for providing help for multimodal applications utilize traditional coding techniques of uniquely constructing help within code linked to the multimodal application and events occurring within the multimodal application. For example, the help can be integrated within a general help file for the application. One problem with this approach is that the speech commands and help code are integrated at a relatively deep level of the application (since available speech commands can change depending upon application state). When code modifications are made to the application, the links to the help files must also be altered and tested. Additionally, when the speech grammar used to programmatically interpret the speech commands changes, corresponding changes must be made to the multimodal application and associated help files.

Problems with maintaining application/help/grammar synchronization are aggravated by emerging software development technologies, such as service oriented architecture (SOA) technologies, which componentized software functionality into discrete units having well defined interfaces. In a SOA, different groups and/or companies typically focus on providing code units that can be combined with code units independently developed by others. Instead of an atomically controlled development environment, a SOA encourages a distributed development environment that results in integrated software products from a multitude of independently developed software building blocks. A SOA can have advantages of improved time to market, massive software reutilization, and a graceful upgrade progression. A SOA can also challenge traditional software design methodologies. For example, it can be difficult to integrate SOA software units with software having low-level code dependencies.

A new approach is needed to implement help within voice-enabled and multimodal applications. The new approach will ideally be capable of working with multimodal applications developed using any software technologies, including SOA based technologies. Further, the approach should be easy to update and maintain as a speech enabled application and/or speech grammars are updated. Moreover, an optimal approach would permit help files to be ported across different applications so that a single help technology can be utilized for both voice-enabled and multimodal applications developed for different platforms.

SUMMARY OF THE INVENTION

A software solution where help files associated with speech commands are implemented within speech grammars in accordance with an embodiment of the inventive arrangements disclosed herein. More specifically, dynamically activateable grammars can contain help fields. The help fields can specify help commands available when the grammar is active, one or more examples for each help command, and related context specific help. The speech grammars can be utilized by a voice-enabled application. One such voice-enabled application is a multimodal application implemented using markup that can be rendered by a multimodal Web browser. A conduit can be established between grammars, application, and/or Web browser, through which help events and help related data payloads can be conveyed. The help information extracted from the active grammar can be visually and/or audibly presented. In one embodiment, a wizard can be included as part of a software development environment that facilitates the embedding of the help fields within the grammars and integrating these help fields to interface elements of the voice-enabled application.

The present invention can be implemented in accordance with numerous aspects consistent with material presented herein. For example, one aspect of the present invention can include a method for providing help to voice-enabled applications. The method can include a step of identifying at least one speech grammar associated with a voice-enabled application. Help fields can be defined within the speech grammar. The help fields can include available speech commands for the voice enabled application. The speech grammar can be activated for use by the voice-enabled application. The available speech commands can be presented to a user of the voice-enabled application. The presented speech commands can be obtained from the help fields.

Another aspect of the present invention can include a speech grammar having at least one help field implemented using Speech Recognition Grammar Specification (SRGS)

metatags. The help field can contain content used by a voice-enabled application. The help fields can contain help data that provides help to a user of the voice-enabled application for speech commands associated with the speech grammar.

Still another aspect of the present invention can include a system for providing help to a voice-enabled application. The system can include a grammar wizard, at least one grammar generated by the grammar wizard, and a multimodal application. The grammar wizard can specify help content associated with available speech commands of a speech grammar. The generated grammar can include words in the grammar and help fields within which help content for the words is contained. The multimodal application can include a help interface. The multimodal application can dynamically load the help content within the help interface at runtime when the associated grammar is dynamically activated.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 4 is code example of a sample grammar that includes help fields in accordance with an embodiment of the inventive arrangements disclosed herein.

DETAILED DESCRIPTION OF THE INVENTION

Figure 1:
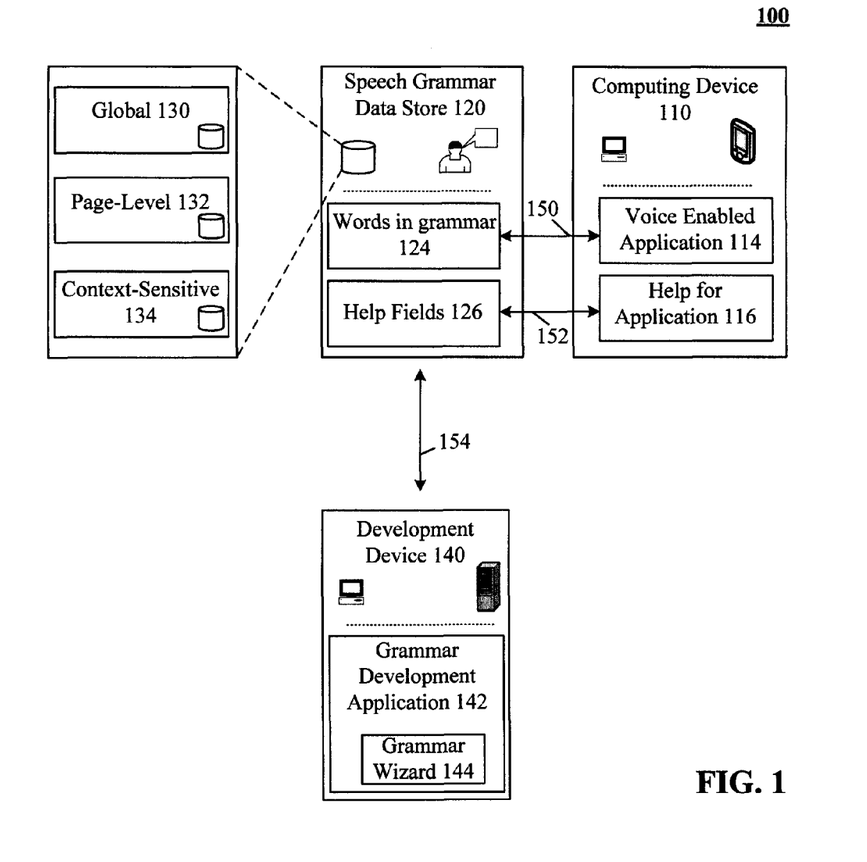
FIG. 1 is a schematic diagram of a system that provides help to voice-enabled applications from content contained in help fields of one or more speech grammars in accordance with an embodiment of the inventive arrangements disclosed herein.

FIG. 1 is a schematic diagram of a system 100 that provides help to voice-enabled applications from content contained in help fields of one or more speech grammars in accordance with an embodiment of the inventive arrangements disclosed herein. System 100 can include a computing device 110 that receives one or more speech grammars from speech grammar data store 120.

Computing device 110 can include any device capable of presenting a voice enabled application 114 and providing help 116 for the application. The computing device 110 can be programmatically attached to one or more audio transducers (not shown), such as a microphone and speaker. The audio transducer can be implemented as an embedded component of the device 110 or can be implemented as a communicatively linked peripheral device, such as a device linked via a Universal Serial Bus (USB) port. Computing device 110 can include, but is not limited to, a computer, a tablet PC, a notebook, a personal data assistant (PDA), a smart phone, a media player, a digital entertainment system, a home audio video system, a wearable computing device, and the like.

In one embodiment, the voice-enabled application 114 can be a multimodal application having a graphical user interface (GUI) and a speech interface. Additionally, the voice-enabled application 114 can be implemented in a markup language and rendered within a browser, which can be a voice-based browser or a multimodal browser.

Help 116 can include a section that presents those commands and/or phrases that the voice-enabled application 114 can recognize. One or more examples of permitted speech commands can also be provided by help 116. As available speech commands for the voice-enabled application 114 change, content of help 116 can automatically change in a corresponding fashion. Help 116 can be implemented in a manner similar to application 114. For example, when application 114 is implemented as markup to be rendered within a browser, help 116 can be implemented as markup. The invention is not limited to browser-based embodiments. The application 114 and help 116 can be implemented in any manner supported by device 110.

Speech grammar data store 120 can include one or more speech grammars. Different types of speech grammars can be included, each being situationally activated. For example, one or more global grammars 130 can be included that can be activated whenever an associated application 114 executes. A page-level grammar 132 and a context-sensitive grammar 134 can be selectively and dynamically activated based upon a state of the voice-enabled application 114.

Each page-level grammar 132 can be dynamically activated/deactivated depending upon a page, screen, or application segment of the voice-enabled application 114. For example, when the voice-enabled application 114 is implemented as a series of Web pages executing within a Web browser, different page-level grammars 132 can be activated/deactivated depending upon the active Web pages.

Context-sensitive grammars 134 can depend upon which elements of voice-enabled application 114 currently possess focus. As focus changes, the context-sensitive grammars 134 can change. For example, in a voice-enabled word processing application a speech command "copy word" can cause a word currently having focus to be copied into the clipboard. When a different word has focus, different content is copied responsive to the same speech command. Additionally, when focus shifts from a text area of the word processing application to a file storage area, commands associated with the context-sensitive grammar 134 for text manipulations can be automatically deactivated. It should be appreciated that there is a direct relationship between active speech grammars, a state of the voice-enabled application 114, and available speech commands.

More specifically, each speech grammar in data store 120 can include one or more words in the grammar 124 and one or more help fields 126. The help fields 126 provide help and examples for speech commands for associated ones of the words in the grammar 124. When different grammars from data store 120 are activated/deactivated, new words 124 are conveyed across conduit 150 to voice-enabled application 114. Typically, this occurs by loading/unloading a new grammar. Streaming technologies can also be utilized where partial grammars can be initially loaded and additional information can be obtained via conduit 150 as needed.

Data can also be conveyed between help fields 126 and the help 116 for the application via help conduit 152. Help 116 for application can be selectively activated and/or deactivated. When help 116 is deactivated, content from help fields 126 is not necessary even though words 124 associated with the help fields 126 are loaded. When help 116 is activated, a help activation event can be conveyed via help conduit 152 and suitable help packets for active grammars can be conveyed in response. Consequently, help 116 can be dynamically populated with content from appropriate help fields 126 as needed.

In one contemplated embodiment, a grammar development application 142 residing upon a development device 140 can be used to facilitate the creation of grammars of data store 120. The grammar development application 142 can include a grammar wizard 144 that prompts a developer for help content. Provided help content and help examples can be automatically placed within help fields 126.

The grammar wizard 144 can provide an option to have help content be automatically generated based on an automatic traversal of a grammar tree. For example, a help example can be automatically generated by the grammar wizard 144 by selecting the first choice of a grammar tree path. Similarly, the grammar wizard can automatically generate visual and/or audible help content based upon the words of an associated grammar. For example, if a grammar is specified as part of XHTML+Voice (X+V) multimodal markup, the grammar wizard 144 can automatically populate help fields 126 for visual and/or audible segment of the X+V markup based upon developer provided information.

Figure 2:
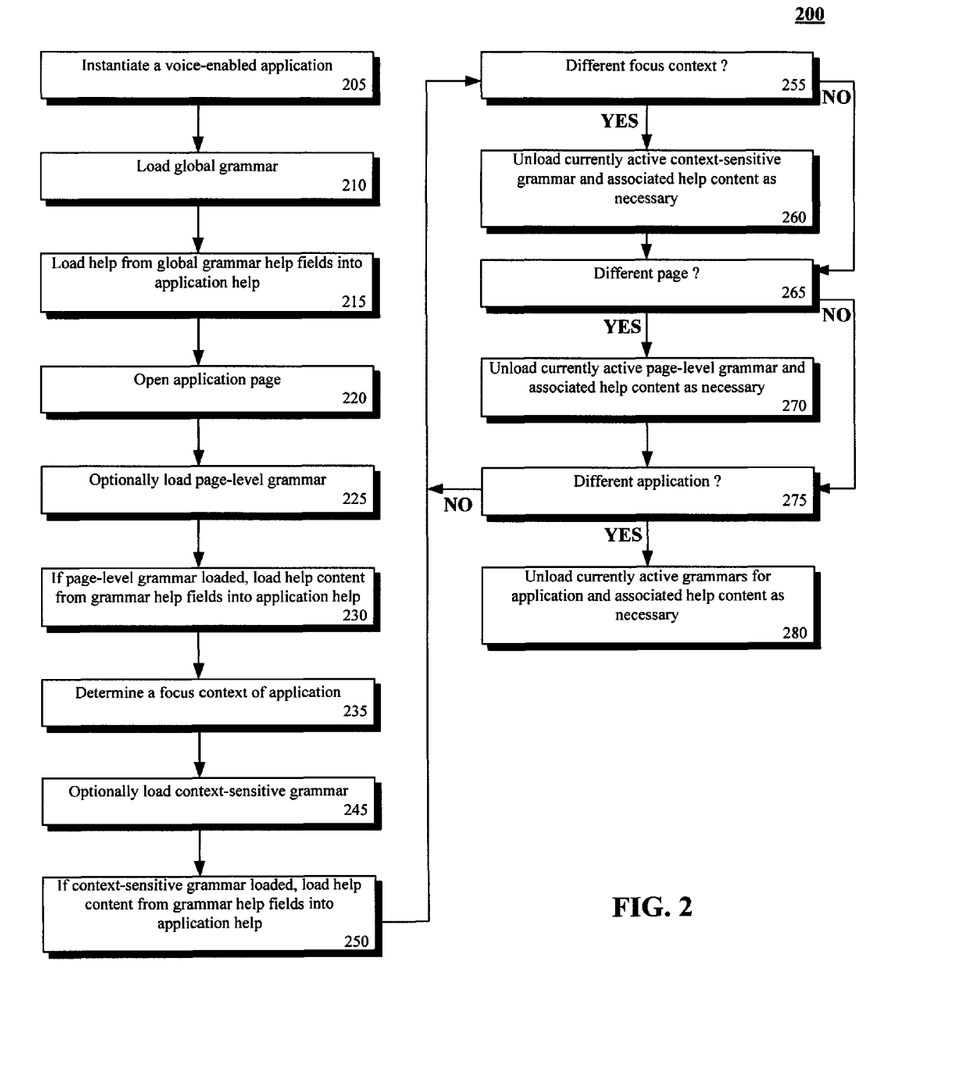
FIG. 2 is a flow chart of a method for dynamically providing help within a voice-enabled application using help fields included within speech grammars in accordance with an embodiment of the inventive arrangements disclosed herein

FIG. 2 is a flow chart of a method 200 for dynamically providing help within a voice-enabled application using help fields included within speech grammars in accordance with an embodiment of the inventive arrangements disclosed herein. Method 200 can be performed in the context of a system 100.

Method 200 can begin in step 205, where a voice-enabled application can be instantiated. In step 210, a global speech grammar for the application can be loaded. The global grammar can include one or more help fields that specify available speech commands. In step 215, the help content from the help fields in the global grammar can be loaded.

In step 220, an application page can be loaded. In step 225, a page-level grammar for the application page can be optionally loaded. This step is optional, because some pages of an application may not be associated with a page-level grammar. In step 230, if a page-level grammar is loaded, help content from the grammar help fields can be loaded.

In step 235, an application focus can be determined. This application focus can be associated with a context-sensitive grammar. In option step 245, if a deactivated context-grammar is associated with the application focus exists, the context-sensitive grammar can be dynamically loaded. In step 250, help content from the grammar help fields within the context-sensitive grammar can be loaded.

In step 255, a check can be performed to determine if a different focus exists. If not, the method can skip from step 255 to step 265. If so, the method can proceed from step 255 to step 260, where a currently active context-sensitive grammar and associated help content can be unloaded. The unloaded or deactivated context-sensitive grammar can be one not applicable for the new focus. A new context-sensitive grammar and related help can be activated/loaded at this time as well.

In step 265, it can be determined whether a new page for the voice-enabled application has been loaded. If not, the method can skip to step 275. If so, the method can proceed to step 270, where a currently active page-level grammar and associated help that are no longer appropriate can be automatically unloaded. If a new page-level grammar exists for the new page, the grammar and associated help content can be activated/loaded at this time.

In step 275, a determination can be made as to whether the voice-enabled application is still being used or whether a new application (which may also be a voice-enabled application) has replaced the previous voice-enabled application. For example, the voice-enabled application can be rendered within a browser and a URL associated with a different application can be selected to replace the voice-enabled application.

If a different application has not been chosen or if the voice-enabled application remains active for any reason, the method can proceed from step 275 to step 255, where a check can be performed against application focus and the method can proceed as previously detailed. When the voice-enabled application is closed for any reason, such as loading a different application, the method can proceed from step 275 to step 280. In step 280, currently active grammars and associated help content for the voice-enabled application can be unloaded.

Figure 3:
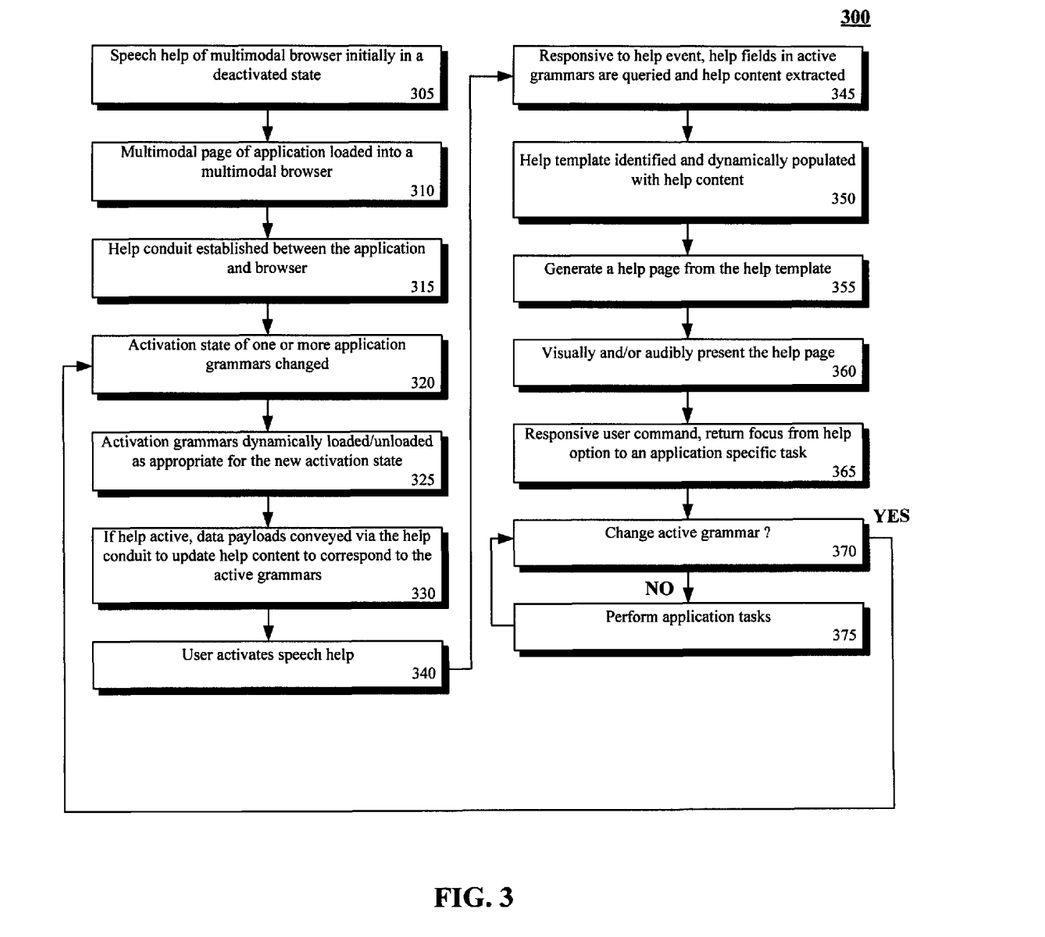
FIG. 3 is a flow chart of a method for dynamically activating grammars and associated speech command help in accordance with an aspect of the inventive arrangements disclosed herein.

FIG. 3 is a flow chart of a method 300 for dynamically activating grammars and associated speech command help in accordance with an aspect of the inventive arrangements disclosed herein. Method 300 can be performed in the context of system 100. Method 300 assumes that the grammars are associated with a voice-enabled markup such as X+V that is rendered by a multimodal browser. It should be understood that these specific details apply to only one contemplated embodiment and that derivative embodiments based upon other implementation specifics are contemplated herein and can be implemented by one or ordinary skill in the art.

Method 300 can begin in step 305, where speech help of a multimodal browser can be initially deactivated. The speech help can be designed to present a list of available speech commands to a user, either audibly, visually, or both. In step 310, an X+V page of an application can be loaded into a multimodal browser. In step 315, a help conduit can be established between the application and the browser. The help conduit can be a communicative link through which data can be conveyed, including, but not limited to, help event data and help data packages, which contain help content.

In step 320, an activation state of a voice-enabled application can change. In step 325, speech grammars associated with the application can be dynamically loaded/unloaded as appropriate for the new activation state. In step 330, if help is active, data payloads containing help content can be conveyed via the help conduit. The data payloads can update help content of the speech help of the multimodal browser to correspond to the active grammars.

In step 340, a user can activate the speech help should the help be currently deactivated. For example, the user can speak "help" or "what can I say" to the voice enabled application. The user can also select a help option from a GUI to enable the speech help. A help request can be conveyed via the help conduit to the voice-enabled application. In step 345, the help request can trigger a help event, which causes help content for all active grammars to be gathered. That is, help fields contained within all active grammars can be queried and help content can be extracted.

In step 350, a help template can be identified using content from one or more of the help fields designed to specify a particular help template. The help template can be an X+V page that the multimodal browser is able to render. The help template can be dynamically populated with help content obtained from the help fields.

In step 355, a help page can be generated from the populated help template. In step 360, the help page can be visually and/or audibly presented as speech help. The presenting of the help page, especially for speech interfaces, can temporarily deactivate or suspend the presentation of application specific information. In step 365, a user command can interrupt the presentation of help information can return application focus back to a previously suspended application state. For example, a user command "exit help" can halt an audibly presented help utterance and can return a speech interface for an application to a pre-help state.

In step 370, one or more application grammar can be optionally changed. For example, a context-specific or page-level grammar can be changed in accordance with a changed state of the application. If the grammar does change in step 370, the method can loop from step 370 to step 320, where speech grammars and associated help content can be dynamically updated in accordance with the application state. If no change of grammar is determined in step 370, the application can proceed to step 375, where an application task can be performed. The method can periodically loop from step 375 to step 370 to check if grammar changes occur that require help content and/or speech grammar adjustments to be made.

FIG. 4 is code example of a sample grammar 400 that includes help fields in accordance with an embodiment of the inventive arrangements disclosed herein. Grammar 400 is one possible example of the grammar stored in data store 120 of system 100. Grammar 400 shows a grammar for a beverage querying application. Grammar 400 can be represented as graphical grammar trees 410, 420, and 430. Grammar 400 can be represented in more detail by grammar 440.

It should be appreciated that grammar 400 is provided for illustrative purposes only and that the invention is not to be construed as limited to details contained within FIG. 4. Instead, one of ordinary skill in the art can comprehend a general principle of embedded help fields from the sample shown in FIG. 4 and apply the general principle to any speech grammar regardless of implementation specifics.

Grammar tree 410 shows a beverage branch 412. Expected beverage request preludes 413 can include "I would like" I want" and "<please> give me." An indefinite article 415 is subsequently expected followed by a size 416 and type 417 of beverage. Beverage size 416 can include size categories 422 of "small," size 424, and "large." Size 424 can include a middle size designator 424 of "medium" or "regular." The type 417 can include beverage types of "coffee," "milk, soft drink type 434, and "lemonade." Soft drink type 434 can include "soda," "pop," and "cola."

Grammar 440 is a XML based grammar conforming to SRGS grammar standards. Grammar 440 can enable a speech grammar having previously described grammar trees 410, 420, and 430. Grammar 440 can also include help fields 442 and example 446. In one embodiment, a wizard 144 invoked from a software development tool can be used to create grammar 440 that includes help fields 442 and example 446.

The help fields 442 permit a specification of a description 443, an identifier 444, and an instructional method 445. The description 443 can designate a speech prompt to which a speech response is expected, such as "What would you like to drink?". The identifier 444 can be used to mark whether grammar 420 is a global, page-level, or context-sensitive grammar. The instructional method 445 can reference a location of a help page, which provides available speech commands for grammar 420.

In grammar 440, help fields 442 are implemented as SRGS metatags. Even more specifically, the help fields conform to standards of the Dublin Core Metadata Initiative. Help tags 442 are not to be limited to this particular arrangement. In other embodiments (not shown), help tags 442 can be implemented in a variety of manners and in accordance with other standards including other standards for SRGS metatags.

Example 446 provides a sample of how a beverage request should be phrased, such as "I would like a medium coffee." Multiple examples 446 can be included in a grammar and can be selectively presented to a user of a speech-enabled application. In one embodiment, if no example 446 is provided within grammar 440, then one can be dynamically generated by traversing one path of the grammar tree. For example, if the first item from each selection of the grammar tree 410-430 is selected, a dynamically constructed example can be "I would like a small coffee." In another embodiment, a wizard 144 can be used to automatically generate example 446 for a grammar developer in the same fashion. A wizard generated example can be included within grammar 440 itself, where it can be modified as desired by the grammar developer.

Figure 5:
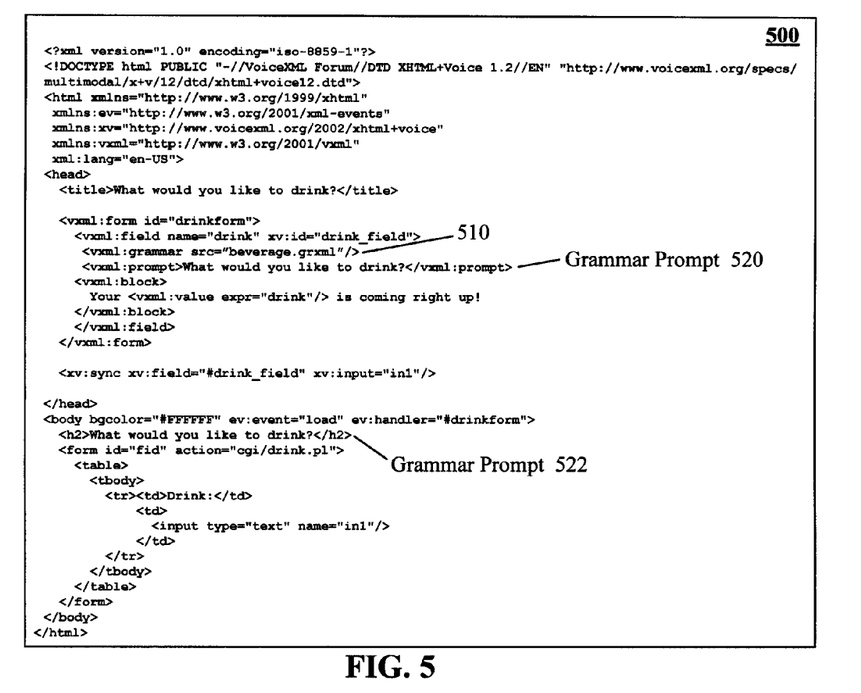
FIG. 5 is a code example of a voice-enabled application referencing grammar in accordance with an embodiment of the inventive arrangements disclosed herein.

FIG. 5 is a code example 500 of a voice-enabled application referencing grammar 400 in accordance with an embodiment of the inventive arrangements disclosed herein. As illustrated, the voice enabled application is implemented in X+V code and can be rendered by a multimodal browser. Code line 510 shows that the grammar "beverage.grxml can be activated. In one embodiment, a grammar prompt 520 and/or 522 can he automatically extracted from a description help tag 443 included within the activated grammar. A software development tool can be used to place the automatically extracted description help tag 443 into the appropriate location of code when the code example 500 was generated.

Figure 6:
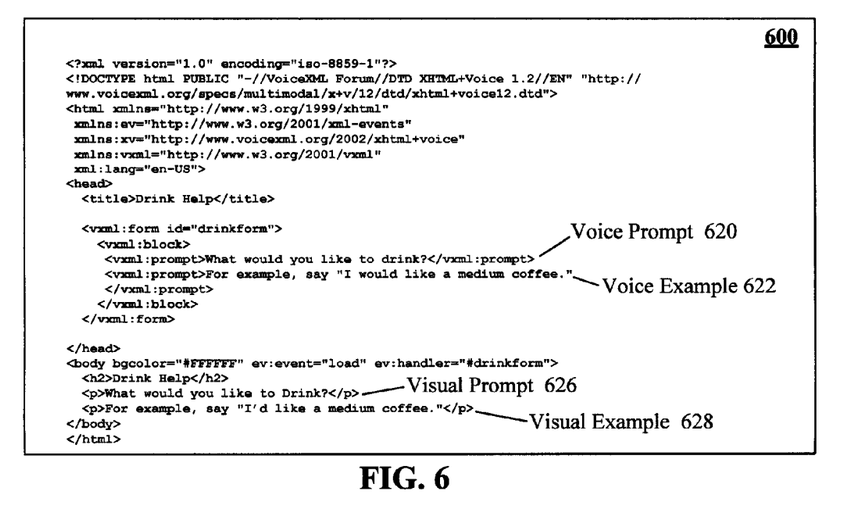
FIG. 6 is a code example of sample help markup for a speech grammar in accordance with an embodiment of the inventive arrangements disclosed herein.

FIG. 6 is a code example 600 of a help for grammar 400 in accordance with an embodiment of the inventive arrangements disclosed herein. Example 600 is a multimodal help page, help/drinkhelp.mxml for the example 500. The help/drinkhelp.mxml file can be a template. Help contents can be dynamically placed within the help/drinkhelp.mxml page directly in response to a user triggering a help event. For example, voice prompt 620 and prompt example 622 can be added to a voice xml block of the drink form. Additionally, visual prompt 626 and visual example 628 can be added to the body of the X+V page. Contents can be added to the template in a variety of manners, such as using macro expansion to dynamically add help content to a static page.

Notably, VoiceXML includes "help" as one speech command automatically included within of a system grammar. Therefore, when a user says help, a help event can be generated by a voice interpreter. When either a voice-enabled application or, in the case of X+V, a multimodal browser receives a help event, help is accessed and placed as content within the template document. The template document can be specified within the grammar, such as by instructional method 445.

Figure 7:
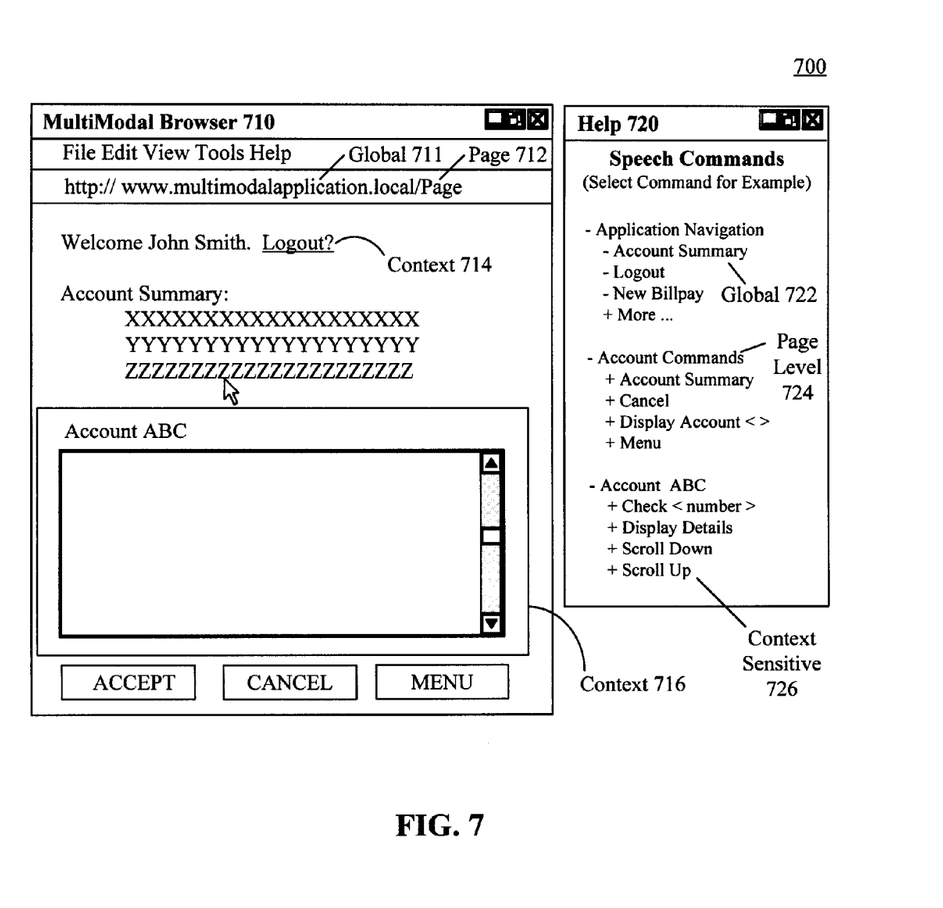
FIG. 7 is a graphical user interface showing a multimodal browser and a help window in accordance with an embodiment of the inventive arrangements disclosed herein.

FIG. 7 is a graphical user interface 700 showing a multimodal browser 710 and a help 720 window in accordance with an embodiment of the inventive arrangements disclosed herein.

The multimodal browser 710 can render a multimodal application. The multimodal application can be written in a markup language, such as X+V. The multimodal application can have an associated global grammar 711 that is loaded when the application is accessed. One or more page-level grammars 712 can also be dynamically activated/deactivated. Additionally, context-sensitive grammars 714 and 716 can be selectively activated depending upon an application state. For example, in the multimodal application, one context-sensitive grammar 714 can be activated/loaded for an account summary context and another context-sensitive grammar 716 can be activated/loaded for a specific account context.

The help window 710 can include multiple voice commands. The help window 710 can be automatically loaded with available speech commands using help content contained within and/or specified by speech grammars. That is, the speech commands appearing in help window 710 can be automatically and dynamically populated from help fields included within one or more speech grammars. Multiple speech grammars can be active at the same time, such as one or more global grammars, one or more page-level grammars, and one or more context sensitive grammars. A user can select any of the available commands from window 710 to be audibly and/or visually presented with an example of a correctly phrased speech command. The help example can be extracted from help fields included within active speech grammars.

In one embodiment, the different speech commands can be ordered in accordance with the type of grammars with which the speech command is associated. For example, global 722 commands can be associated with a global grammar; page-level 724 commands can be associated with a page-level grammar; and context-sensitive 726 commands can be associated with one or more context-sensitive grammars.

Although help 720 shows the different commands as an expandable hierarchy, any of a variety of other arrangements for the commands can be utilized. For example, commands can be provided in accordance with historical usage, with rarely used commands being selectable only after selecting a "display all" or "more" command. In a different configuration, context-sensitive commands can first be displayed, followed by page-level commands, followed by global commands, under the assumption that users are likely to be more interested in more context specific commands. User configurable options can be provided so that a user can configure the appearance of the help window 720, as desired.

Figure 8:
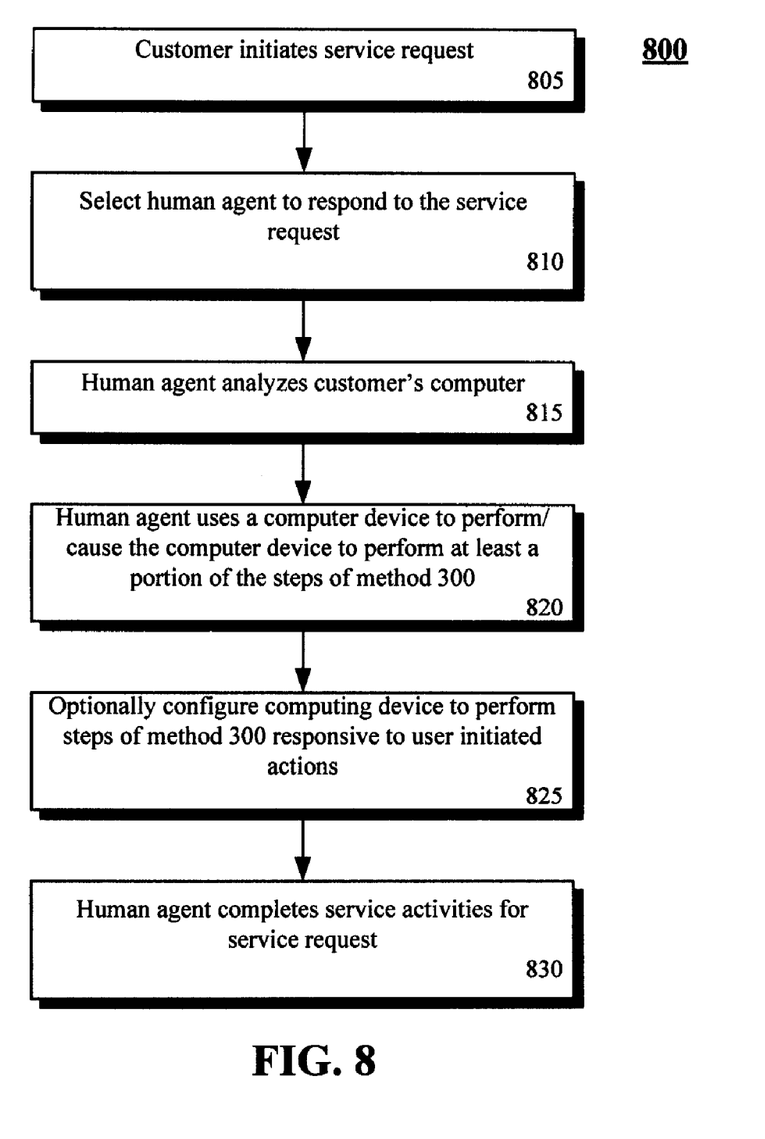
FIG. 8 is a flow chart of a method, where a service agent can configure a system that uses speech command help derived from active grammars in accordance with an embodiment of the inventive arrangements disclosed herein.

FIG. 8 is a flow chart of a method 800, where a service agent can configure a system that uses speech command help derived from active grammars in accordance with an embodiment of the inventive arrangements disclosed herein. Method 800 can be performed in the context of system 100.

Method 800 can begin in step 805, when a customer initiates a service request. The service request can be a request for a service agent to modify existing grammars and/or applications to enable grammar embedded help. The service request can be for training to enable developers associated with the customer to construct multimodal applications, such as X+V applications. The service request can also be for a technician to troubleshoot a problem with an existing system.

In step 810, a human agent can be selected to respond to the service request. In step 815, the human agent can analyze a customer's current system and/or problem and can responsively develop a solution. The solution, for example, can involve the human agent guiding a software developer through a step of a multimodal application process.

In step 820, the human agent can use one or more computing devices to perform or to cause the computer device to perform the steps of method 300. For example, the agent can co-browse with a software developer and show the software developer how to utilize a grammar wizard to include help within grammar fields.

In optional step 825, the human agent can configure a computing device of the customer in a manner that the customer or clients of the customer can perform one or more steps of method 300 in the future. For example, the service agent can establish one or more grammars or help templates and can configure a voice-enabled application so that help content contained in the grammars can be provided for the voice-enabled application. In step 830, the human agent can complete the service activities.

It should be noted that while the human agent may physically travel to a customer location to adjust the customer's computer, physical travel may be unnecessary. For example, the human agent can provide telephone based customer support to a customer experiencing problems.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for providing help for a voice-enabled application, the method comprising:
   in response to user input requesting help, dynamically generating context-sensitive help content by extracting from an active speech grammar, using at least one processor, grammar content identified in the active speech grammar with a help identifier as being grammar content about which help can be provided to the user relating to user uncertainty about how to interact with the voice-enabled application, wherein the context-sensitive help content includes at least one available speech command; and presenting the at least one available speech command to the user.

2. The method of claim 1, further comprising changing the context-sensitive help content in response to a change in activation state of the active speech grammar.

3. The method of claim 1, wherein a plurality of speech grammars including the active speech grammar are simultaneously active, wherein dynamically generating context-sensitive help comprises extracting grammar content from each of the plurality of speech grammars, and wherein the presenting step presents available speech commands associated with each of the plurality of speech grammars.

4. The method of claim 3, wherein the plurality of speech grammars includes at least two different types of grammars selected from a group of grammar types consisting of a context-sensitive grammar, a page-level grammar, and a global grammar.

5. The method of claim 4, wherein the at least two different types of grammars comprises at least three different types of grammars selected from said group.

6. The method of claim 1, wherein the voice-enabled application is a multimodal application, and wherein the presenting step visually presents the at least one available speech command to the user of the voice-enabled application.

7. The method of claim 6, wherein a window in which the at least one available speech command is visually presented is selectively displayed responsive to the user input requesting help.

8. The method of claim 1, wherein the presenting step audibly presents the at least one available speech commands command to the user of the voice-enabled application responsive to the user input requesting help.

9. The method of claim 8, wherein the voice-enabled application is a multimodal application having a graphical user interface.

10. The method of claim 1, wherein the context-sensitive help content comprises at least one example utterance corresponding to the at least one available speech command, and wherein the presenting step further comprises presenting the at least one example utterance to the user.

11. The method of claim 1, wherein the active speech grammar is an SRGS based grammar, and wherein the help identifier is an SRGS metatag.

12. The method of claim 1, wherein the voice-enabled application is a multimodal application that executes within a multimodal browser.

13. The method of claim 12 wherein the voice-enabled application is written in a multimodal markup language.

14. The method of claim 12, further comprising establishing a help conduit between the multimodal application and the multimodal browser, wherein data payloads are conveyed through the help conduit.

15. The method of claim 1, further comprising providing a development wizard that provides developers a means to place the help identifier within the active speech grammar.

16. The method of claim 1, wherein at least one of the steps is performed by at least one machine in accordance with at least one computer program having a plurality of code sections that are executable by the at least one machine.

17. The method of claim 1, wherein at least one of the steps is performed by at least one of a service agent and a computing device manipulated by the service agent, the steps being performed in response to a service request.

18. A device encoded with instructions which, when executed by a computer system, cause the computer system to perform a method comprising:
  in response to user input to a voice-enabled application requesting help, dynamically generating context-sensitive help content by extracting, from at least one active speech grammar of the voice-enabled application, grammar content identified in the at least one active speech grammar with a help identifier as being grammar content about which help can be provided to the user, wherein the context-sensitive help content relates to user uncertainty about how to interact with the voice-enabled application and contains at least one speech command associated with the at least one active speech grammar.

19. The device of claim 18, wherein the context-sensitive help content includes at least one help example associated with the at least one speech command, said at least one help example being indicative of a proper use of the at least one speech command.

20. A system for providing help for a voice-enabled application, the system comprising:
  at least one processor programmed with:
    at least one speech grammar of the voice-enabled application, the at least one speech grammar including grammar content;
    a grammar wizard configured to insert within the at least one speech grammar a help identifier identifying at least some of the grammar content about which a user of the voice-enabled application may obtain help relating to user uncertainty about how to interact with the voice-enabled application; and
    the voice-enabled application, the voice-enabled application comprising a help interface, wherein the voice-enabled application is configured to dynamically load context-sensitive help content within the help interface at runtime when the at least one speech grammar is dynamically activated by extracting at least some of the grammar content by reference to the help identifier.

21. A method, comprising:
  automatically inserting help identifiers in a speech grammar of a voice-enabled application using at least one processor, wherein automatically inserting the help identifiers comprises traversing the speech grammar, determining grammar content of the speech grammar about which help can be provided to a user of the voice-enabled application, and creating help identifiers to identify the grammar content about which help can be provided to the user.

22. The method of claim 1, further comprising automatically inserting the help identifier into the active speech grammar.

* * * * *